United States Patent [19]

Klotz et al.

[11] Patent Number: 5,096,547
[45] Date of Patent: Mar. 17, 1992

[54] PREPARATION OF CHROMIC ACID USING BIPOLAR MEMBRANES

[75] Inventors: Helmut Klotz, Bergisch Gladbach; Rainer Weber; Wolfgang Ohlendorf, both of Leverkusen, all of Fed. Rep. of Germany

[73] Assignee: Bayer Aktiengesellschaft, Leverkusen, Fed. Rep. of Germany

[21] Appl. No.: 718,729

[22] Filed: Jun. 21, 1991

[30] Foreign Application Priority Data

Jun. 23, 1990 [DE] Fed. Rep. of Germany ....... 4020051

[51] Int. Cl.⁵ ............................ C25B 1/00; C25B 1/22
[52] U.S. Cl. .................................... 204/59 R; 204/89; 204/97
[58] Field of Search ........................... 204/59 R, 89, 97

[56] References Cited

U.S. PATENT DOCUMENTS 3,305,463 2/1967 Carlin ..................................... 204/89
4,273,628 6/1981 Kidon et al. ........................... 204/97

FOREIGN PATENT DOCUMENTS 0124007 11/1984 European Pat. Off. .
961200 6/1964 United Kingdom .
2051868 1/1981 United Kingdom .

Primary Examiner—John Niebling
Assistant Examiner—David G. Ryser
Attorney, Agent, or Firm—Sprung, Horn, Kramer & Woods

[57] ABSTRACT

The invention relates to a process for the preparation of alkali metal dichromates and chromic acid by the electrolysis of monochromate and/or dichromate solutions in a multi-chamber cell, wherein the anode chamber is shielded from the solution of chromate, dichromate and/or chromic acid by a bipolar ion exchanger membrane.

1 Claim, 3 Drawing Sheets

PREPARATION OF CHROMIC ACID USING BIPOLAR MEMBRANES

This invention relates to a process for the preparation of alkali metal dichromates and chromic acid by the electrolysis of alkali metal monochromate or alkali metal dichromate solutions.

According to U.S. Pat. No. 3,305,463 and CA-A-739 447 the electrolytic preparation of dichromates and chromic acid takes place in electrolysis cells in which the electrode compartments are separated by cation exchange membranes.

For the production of alkali metal dichromates, alkali metal monochromate solutions or suspensions are introduced into the anode compartment of the cell and converted into an alkali metal chromate solution in which alkali metal ions are selectively transferred to the cathode compartment through the membrane. For the preparation of chromic acid, alkali metal dichromate or alkali metal monochromate solutions or a mixture of alkali metal dichromate and alkali metal monochromate solutions are introduced into the anode compartment and converted into solutions containing chromic acid. Sodium monochromate and/or sodium dichromate is generally used for these processes. In both processes, an alkaline solution containing alkali metal ions is obtained in the cathode compartment. This solution may consist, for example, of an aqueous sodium hydroxide solution or, as described in CA-A-739 447, of an aqueous solution containing sodium carbonate.

For the production of alkali metal dichromate or chromic acid crystals, the solutions formed in the anode compartments the cells are concentrated by evaporation; crystallisation of sodium dichromate may be carried out at, for example, 80° C. and that of chromic acid at 60°-100° C. The crystallised products are separated, optionally washed, and dried.

Anode materials of lead or lead alloys as described in DE-A 3 020 260 are suitable in principle but discharge lead ions into the anodic solution, which leads to contamination of the alkali metal dichromates and chromic acid prepared. All so-called dimensionally stable anodes such as those described e.g. in DE-A 3 020 260, consisting of a valve metal such as titanium coated with an electrocatalytically active layer of noble metal or a noble metal oxide have the disadvantage that their life is limited to less than 100 days, in particular at elevated temperatures above 60° C. and current densities from 2-5 $KA/m^2$. There has been no lack of attempts to equip such anodes based on valve metal with more stable catalytically active coatings, for example as described in DE-OS 3 829 119 or DE-OS 3 905 082. Thus an increase in the service life of the noble metal coatings has been achieved by means of suitable interlayers. These interlayers are, however, by no means sufficient to render the cost of the anodes economically negligible as part of the cost of the whole process. The limit to the life of such anodes is considered (see DE-OS 3 905 082) to be due to the fact that the valve metal is passivated by the permeation of oxygen through the electroactive layer, and the coating of noble metal is split off.

This strictly limited service life of anodes based on valve metal is overcome by the process of electrolysis according to the invention for the preparation of alkali metal chromates and chromic acid, in which the anodes are only subjected to the wear of a normal water electrolysis. According to A. Schmidt, Angewandte Elektrochemie, Verlag Chemie 1976, page 123, water electrolysis with an alkaline electrolyte allows nickel or iron to be used.

It has now surprisingly been found that metals or alloys such as iron or nickel may be used as anodes if the anode compartment is separated from the dichromate-containing and/or chromic acid-containing solution by a bipolar ion exchange membrane. A further advantage is the drastic reduction in the total number of electrodes required. A bipolar membrane is basically a combination of a cation exchange membrane and an anion exchange membrane. Water penetrating into the boundary layer by diffusion is dissociated and the $H^+$-ions reach the outside through the cation side and the $OH^-$-ions through the anion side of the membrane. Such bipolar membranes have been described by Nagasubramanian et al, AIChE Symp. Ser. 76(192)97-104

U.S. Pat. No. 4,355,116 of Oct. 19, 1982.

Figure 1:
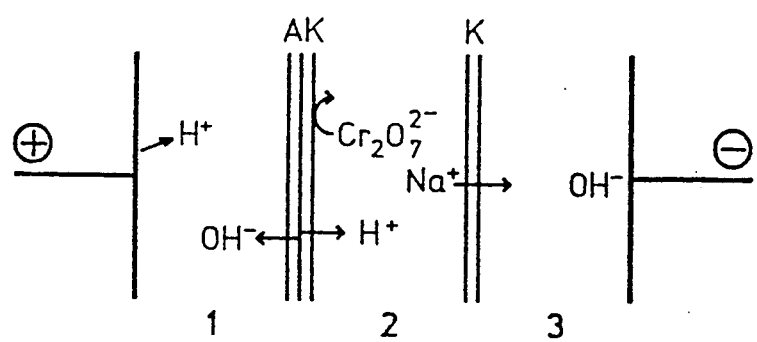
FIG. 1 depicts the basic cell of the present invention, and shows the arrangement of the two membranes.
Figure 2:
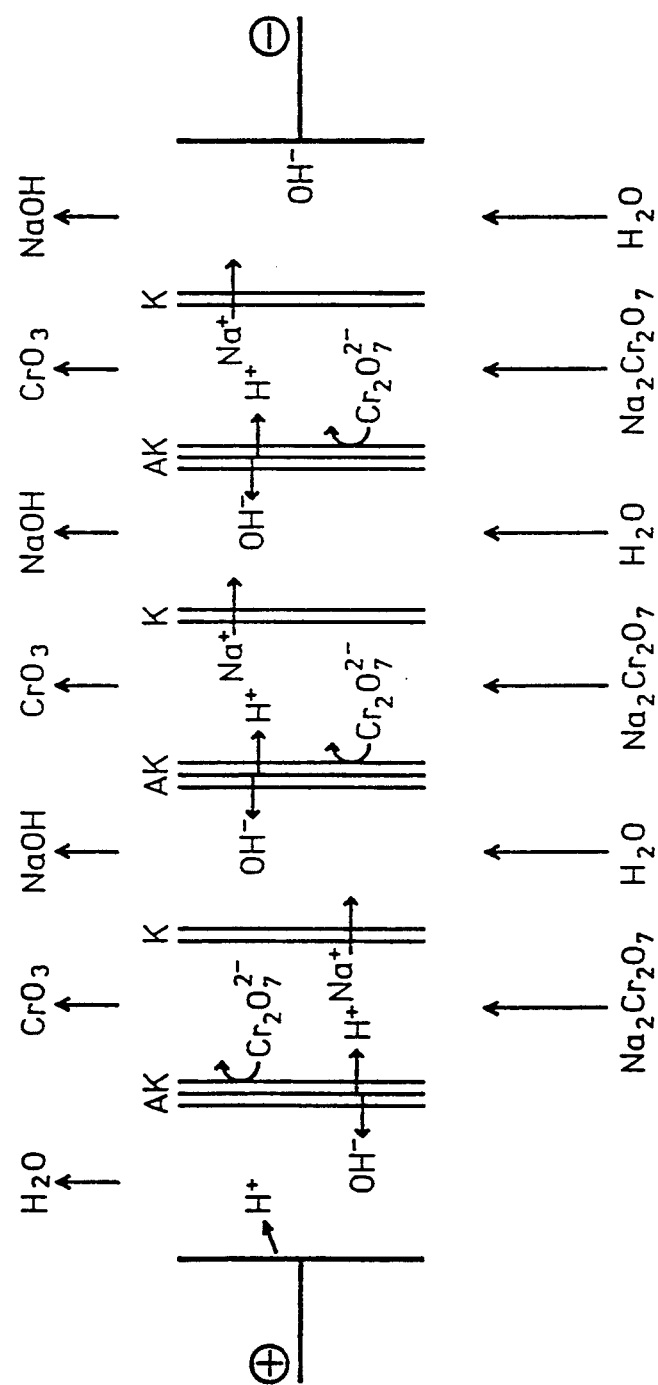
FIG. 2 depicts a combination of several basic cells or "monocells", to form a multicell block.

The process according to the invention is illustrated in FIGS. 1 and 2. The cell consists, for example, of 3 chambers (chambers 1, 2 and 3, see FIG. 2) separated by a bipolar membrane and a cation exchanger membrane. The arrangement of the two membranes is shown in FIG. 1. An aqueous solution of alkali metal dichromate, alkali metal monochromate or a mixture of alkali metal dichromate and alkali metal monochromate flows into chamber 2. $Na^+$-ions are selectively transferred from chamber 2 into chamber 3 through the cation exchange membrane "K". Sodium hydroxide solution is formed by means of the hydroxyl ions in chamber 3 and is continuously withdrawn from this chamber. The $Na^+$-ions transferred from chamber 2 to chamber 3 are replaced by $H^+$-ions which are obtained from the dissociation of water at the boundary surface in the bipolar membranes.

This results in progressive acidification of the chromates, leading to the formation of dichromate and chromic acid. In accordance with the present invention, the selective behaviour of the bipolar membrane blocks the entrance of monochromate and dichromate ions and the entry of chromic acid into the anode compartment. The hydroxyl ions are derived from the dissociation of water within the sandwich membrane and combine with the protons of the decomposition of water to form water. Since on a large technical scale all the transports of material described only take place by flow of current, it is necessary to introduce charge carriers into the anode chamber since water itself is not sufficiently conductive for the electric current. The charge carrier used is a dilute sodium hydroxide solution which is pumped through the anode compartment. The anode consists, as is known, of nickel plated iron and the cathode consists of nickel or some other metal conventionally used in water electrolysis. The basic substance of the bipolar membranes preferably consists of perfluorinated compounds such as that described under the name of Nafion ® for the cationic part. The anionic part has the structure described in EP-A 0 221 751.

The cell illustrated in FIG. 1 constitutes only one unit. Many such "monocells" may be combined to form a block, FIG. 2. The combination of many "monocells" reduces the number of electrodes.

Thus, in the preferred embodiment of the present invention, a plurality of alternating bipolar membranes and cation exchange membranes are arranged between the anode and the cathode of an electrolysis cell, which subdivide the cell into a plurality of compartments which are separated from each other and into which water (or dilute sodium hydroxide solution) and sodium bichromate solution are alternately introduced and from which sodium hydroxide solution and chromic acid/sodium bichromate solution are correspondingly removed. Dilute sodium hydroxide solution is circulated in the compartment containing the anode. Since gases are only produced in the anode-containing compartment (oxygen) and in the cathode-containing compartment (hydrogen), the distance between the bipolar membrane and the cation exchange membrane in the other compartments can be kept very small. According to the invention a distance of 0.5 to 2 mm between the membranes is sufficient.

The electrical resistance of such a cell is essentially determined by the potential differences necessary for the production of hydroxyl and hydrogen ions. The necessary potential difference at the anode and at the cathode is about 2 V for the electrochemical decomposition of water, whereas the necessary potential difference via the bipolar membrane is in each case only about 0.6 V for the electrolytic Dissoziation of water, without consideration of overvoltages of electrode materials.

The energy consumption of an electrolysis cell according to the invention is therefore all the more favourable, the more membranes are arranged between the anode and the cathode.

For technical reasons a number n of from 5 to 20 bipolar membranes and from 5 to 20 cation exchange membranes is preferred according to the invention, so that the electrolysis cell is subdivided into $(2n+1)=11$ to 41 compartments.

Figure 3:
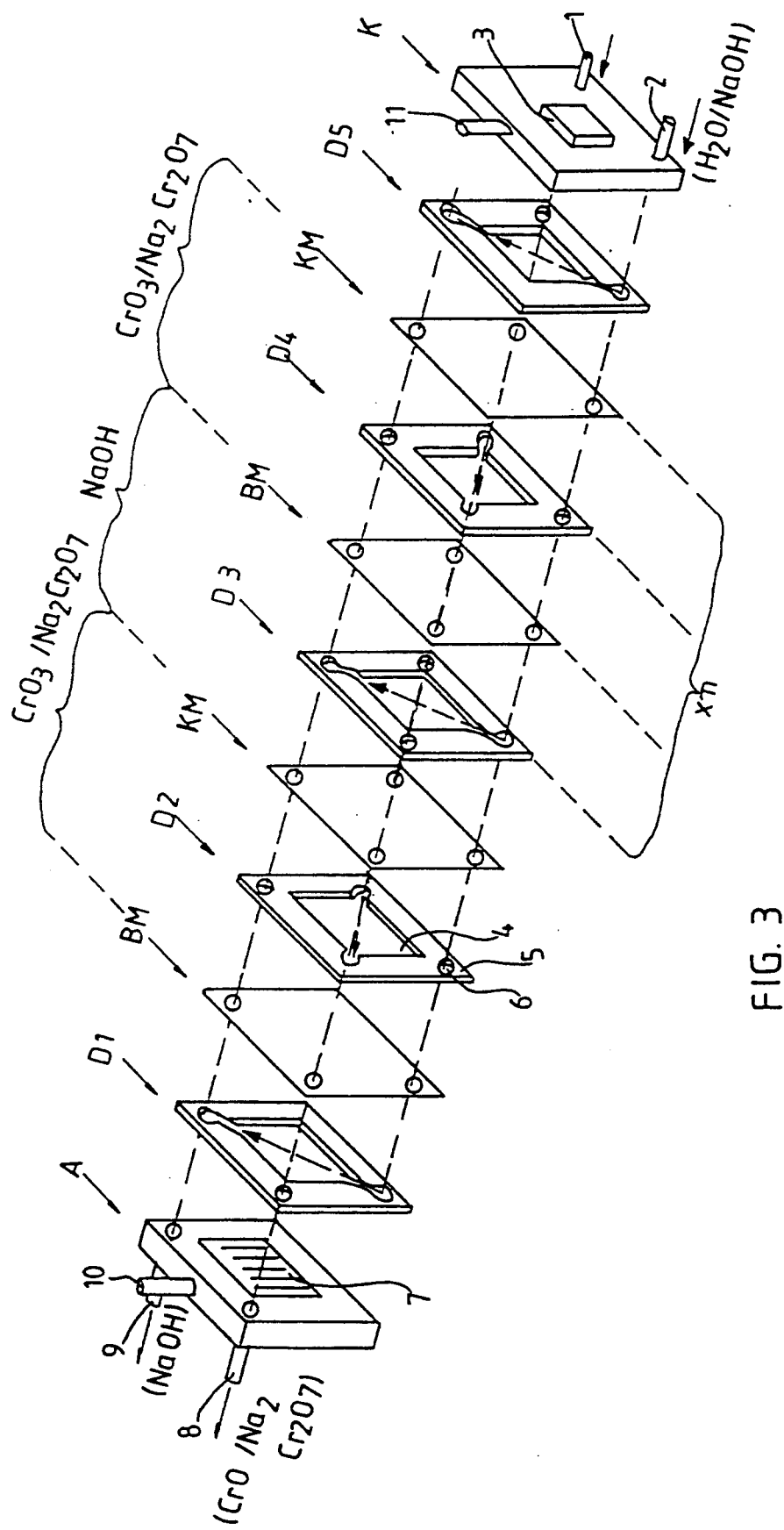
FIG. 3 depicts in more detail the electrolysis cell of this invention, illustrating the anode end block A, cathode exchange membrane CM, bipolar membrane BM, cathode block C and spacers D.

FIG. 3 shows an electrolysis cell according to the invention. It consists of an anode end block A, a cathode exchange membrane CM, a bipolar membrane BM, a cathode block C and spacers D. Elements BM, CM and D have through-holes in their four corners for the inflowing substance streams consisting of water or dilute sodium hydroxide solution and sodium bichromate solution and the outflowing substance streams consisting of sodium hydroxide solution and chromic acid/sodium bichromate solution. The arrows illustrate the direction of flow of the substance streams. The spacers D, which on the one hand provide the spacing between the membranes and on the other hand serve to disperse the substance streams, consist of a relatively coarse-meshed liquid-permeable PTFE fabric 4, onto the edges of which spacing and sealing surfaces 5 of a thickness of about 1 mm are vulcanised. Two diagonally opposing through-holes 6 of each spacer are sealed off from the electrolysis compartment defined by the open fabric surface. The other two through-holes 6 of each spacer allow diagonal flow through the electrolysis compartment. According to the invention the group consisting of elements CM, $D_4$, BM and $D_3$ is present from 5 to 20 times. Sodium bichromate solution is introduced at point 1, passes through the adjacent through-hole of cation exchange membrane CM, and flows diagonally through the elecrolysis compartments defined by $D_4$, whereby chromic acid is produced. The resulting chromic acid/sodium bichromate mixture is removed from the cell at point 8. Water or dilute sodium hydroxide solution is introduced at point 2 and passes diagonally through the (non-visible) anode compartment and the electrolysis compartments defined by $D_2$. Concentrated sodium hydroxide solution is removed at point 9. The hydrogen gas formed at the cathode escapes at point 11. The oxygen formed at the cathode escapes at point 10. The device for pressing elements A, n(CM, $D_4$, BM, $D_3$) and C together is not shown. 3 indicates the electricity supply point for the anode. 7 indicates the cathode shaped in the form of a grid.

EXAMPLE

An experimental electrolysis cell corresponding to FIG. 3 was used in which the cross-sectional size of the anode, cathode and fabric 4 was $100 \times 100$ mm$^2$. The cation exchange membrane CM was Nafion ® 324 from Du Pont. The bipolar membrane used was one obtainable from WSI Technologies, Inc., St. Louis, Mo., USA.

The cell contained 5 membranes of each type. A solution of 800 g/l $Na_2Cr_2O_7$/l and water was introduced. The current strength was 15 Å. A voltage of between 10 and 12 V was measured between the anode and the cathode. The degree of acidification of the chromic acid/sodium bichromate solution removed was 27.4%. Also a 15% sodium hydroxide solution was produced which flowed out through the anode and cathode compartment to guarantee conductivity.

Both the anode and the cathode consisted of iron.

We claim:

1. A process for the preparation of alkali metal dichromates and chromic acid by the electrolysis of monochromate or dichromate solutions in a multichamber cell comprising at least one anode chamber, characterized in that the anode chamber is shielded from the solution of monochromate dichromate or chromic acid by a bipolar ion exchanger membrane.

* * * * *